United States Patent [19]

Hildebrand

[11] Patent Number: 5,227,798
[45] Date of Patent: Jul. 13, 1993

[54] PASSIVE TRANSMITTING SENSOR

[75] Inventor: Gregory C. Hildebrand, Rio Linda, Calif.

[73] Assignee: The United States of America as represented by the Secretary of the Air Force, Washington, D.C.

[21] Appl. No.: 904,624

[22] Filed: Jun. 24, 1992

[51] Int. Cl.$^5$ ............................................. G01S 13/80
[52] U.S. Cl. .......................................... 342/51; 342/44
[58] Field of Search .................... 342/51, 42, 44, 50

[56] References Cited

U.S. PATENT DOCUMENTS

| | | | |
|---|---|---|---|
| 2,484,218 | 10/1949 | Giffen | 177/351 |
| 3,521,280 | 7/1970 | Janco et al. | 343/6.5 |
| 3,671,721 | 6/1972 | Hunn et al. | 235/61.11 H |
| 3,723,966 | 3/1973 | Mueller et al. | 455/99 X |
| 3,806,905 | 4/1974 | Strenglein | 342/50 X |
| 3,911,434 | 10/1975 | Cook | 342/50 X |
| 4,274,089 | 6/1981 | Giles | 340/572 |
| 4,345,253 | 8/1982 | Hoover | 342/44 |
| 4,752,680 | 6/1988 | Larsson | 235/492 |
| 4,911,217 | 3/1990 | Dunn et al. | 342/44 X |
| 5,041,826 | 8/1991 | Milheiser | 455/41 |

OTHER PUBLICATIONS

Warnagiris, Thomas J., "Induction Field Pssive Transmitter", dated Apr. 4, 1990.
Swinyard, W. O., "Measurement of Loop-Antenna Receivers", Proceedings of the I.R.E., Jul. 1941, pp. 382-387.
Przedpelski, Andrzej B., "Near Field" Communication, R & D Laboratory, A.F.R. Products, Inc. Boulder, CO 80301, Mar./Apr.

Primary Examiner—John B. Sotomayor
Attorney, Agent, or Firm—Irwin P. Garfinkle; Donald J. Singer

[57] ABSTRACT

The disclosed system comprises a receiver that is inductively coupled to one or more passive transmitters by means of a receiving inductor. The receiver comprises a sweep signal source which is coupled equally to the receiving inductor and a reference inductor. The receiving inductor is coupled to a passive transmitter which includes an L-R-C circuit comprised of a transmitting inductor, a temperature-dependent capacitor, and a resistor that may be variable or fixed, depending upon the application. As the sweep signal source passes through the resonant frequency of the passive transmitter, the passive transmitter forms a low impedance load magnetically coupled to the receiving inductor by means of the near or induction electromagnetic field produced by the inductor. Changes in the resonant frequency are used to determine temperature variation. Changes in the peak voltages are a determinant of resistor variation resulting from changes in pressure or strain, or they are a determinant of changes in proximity of the passive transmitter to the receiver, or the resistor variation resulting from changes in pressure or strain.

5 Claims, 2 Drawing Sheets

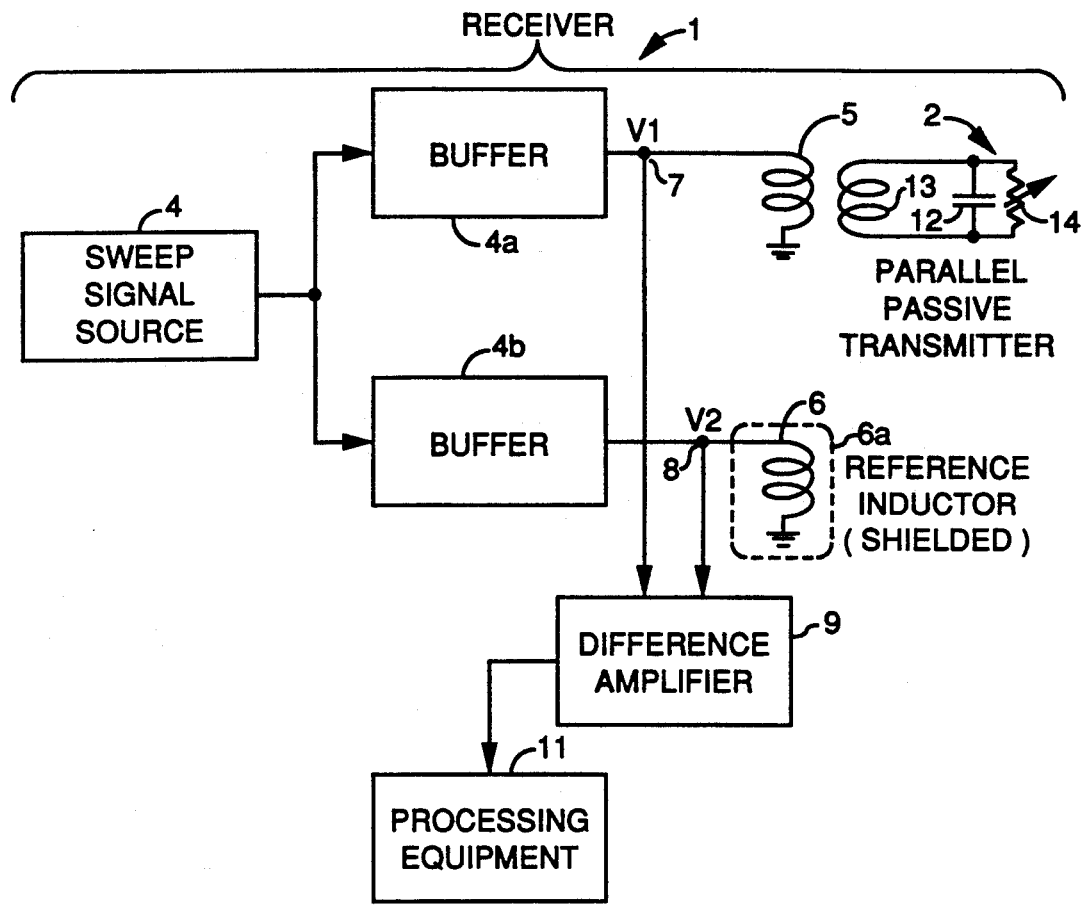
FIG. 1
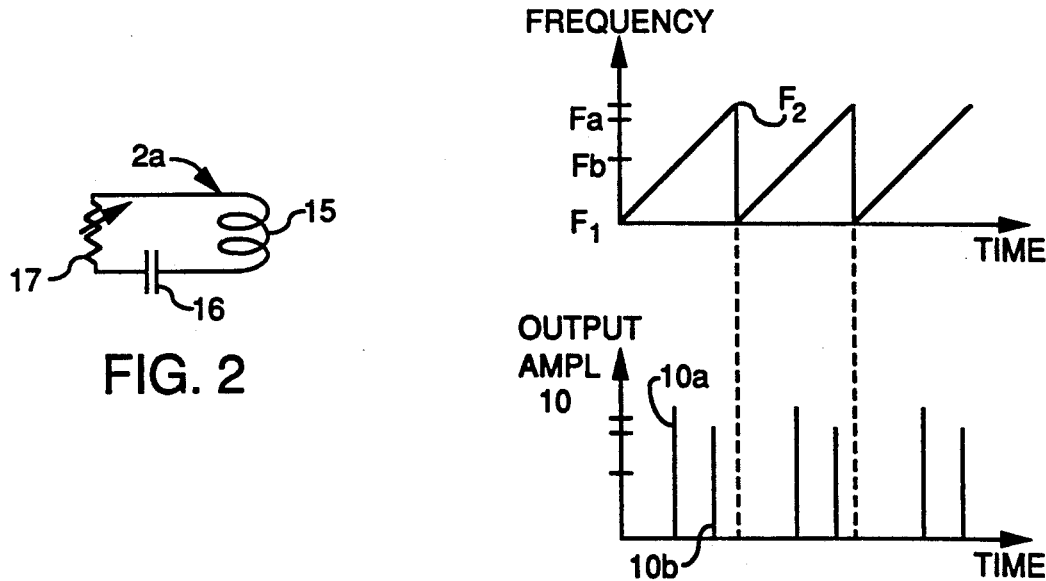
FIG. 2
FIG. 3

PASSIVE TRANSMITTING SENSOR

STATEMENT OF GOVERNMENT INTEREST

The invention described herein may be manufactured and used by or for the Government for governmental purposes without the payment of any royalty thereon.

This invention provides an embeddable smart sensor for sensing temperature, position, or pressure, in which the sensor requires no physical connection to other equipment, maintains stealthiness, and requires no power source. The sensor equipment, in its various configurations, is intended to detect temperature, pressure, strain, disbonds or distance, and various other conditions.

BACKGROUND CF THE INVENTION

Inductive coupling devices have been in use for many years, but in most instances some sort of power source has been required at the location of the of the transmitter. The recent prior art invention of the induction field passive transmitter provides a method of transmitting information from an unpowered transmitter. Such an invention was disclosed in an unpublished invention disclosure entitled *Induction Field Passive Transmitter* by Warnagaris, dated Apr. 4, 1990. A copy of the Warnagaris disclosure is included in the Prior Art Statement filed along with this application. This invention is an improvement over Warnagaris in that it provides specific means, namely a specially selected resistor placed in the L-C circuit of Warnagaris, for obtaining various results from the transmitter which are not achievable by Warnagaris.

OBJECTS OF THE INVENTION

It is an object of this invention to provide a passive transmitter comprising a resonant L-R-C circuit having a temperature variable capacitor, and a resistance element which is variable in response to various environmental changes, including changes in strain or pressure.

Another object of this invention is to provide a passive transmitter which can be embedded in a structure, and which requires no power supply, and reacts to changes in temperature, distance, strain, pressure, and other environmental factors. The passive transmitter thus serves as a sensor. In this application the term "sensor" refers to the passive transmitter.

BRIEF DESCRIPTION OF THE DRAWINGS

For further objects of this invention, reference should now be made to the following detailed specification and to the accompanying drawings in which:

FIG. 1 is a schematic representation of a preferred embodiment of this invention using a passive parallel inductive transmitter;

FIG. 2 shows a modification of the passive transmitter;

FIG. 3 is a series of curves demonstrating the operation of the system;

DESCRIPTION OF THE PREFERRED EMBODIMENTS

Figure 4:
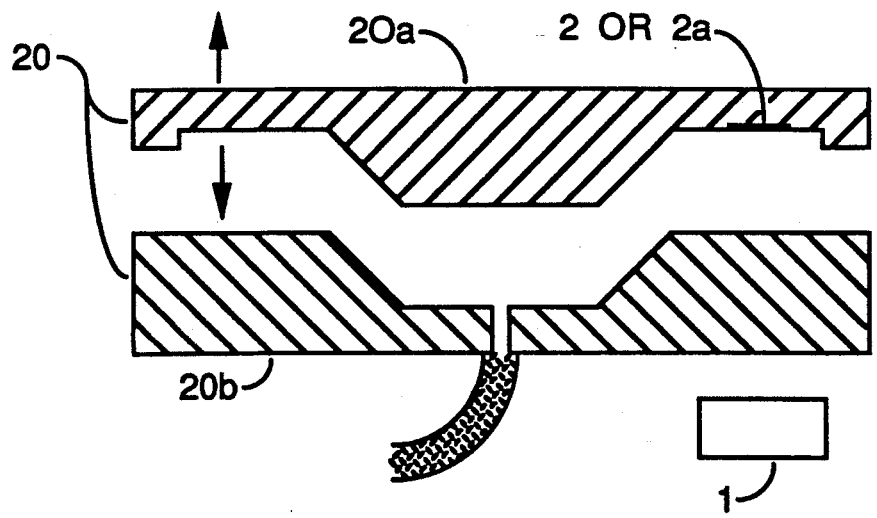
FIG. 4 shows one potential application of the system.

One preferred embodiment of the system is shown in FIG. 1 as comprising a receiver 1 that is inductively coupled to one or more passive transmitters 2 by means of a receiving inductor 5. The receiver 1 comprises a sweep signal source 4 which is coupled equally through buffers 4a and 4b, respectively, to the receiving inductor 5 and a reference inductor 6, whose respective voltages are applied to a difference amplifier 9. The inductor 5 is coupled to the passive transmitter 2, while the inductor 6 is a reference inductor. The reference inductor 6 is shielded by means of a shield 6a to prevent any coupling to the passive transmitter 2.

Because the inductors 5 and 6 are equally fed by the sweep signal source 4, the voltages V1 (at terminal 7) and V2 (at terminal 8) which feed the inductors 5 and 6, respectively, are normally equal, (that is, in the absence of the passive transmitter 2). In the presence of the passive transmitter 2, however, as the sweep signal source 4 passes through the resonant frequency of the passive transmitter 2, the passive transmitter 2 forms a low impedance load magnetically coupled to the inductor 5 by means of the near or induction electromagnetic field produced by the inductor 5. This load reduces the voltage V1 across the inductor 5 causing a difference voltage between the voltage V1 and V2. The difference Amplifier 9 produces an output signal 10 which is shown in FIG. 3. The output 10 is the output of the receiver 1 and can be fed into other processing equipment 11 for further processing.

As shown in FIG. 1, the passive transmitter 2 comprises a temperature responsive capacitor 12, an inductor 13 and a resistor 14, connected as an L-R-C circuit. In FIG. 1, the L-R-C circuit is shown in parallel. In FIG. 2, the L-R-C circuit of the transmitter 2a is connected in series. The resistor 14 in the parallel passive transmitter 2 and resistor 17 in the series passive transmitter 2a can be variable resistors as shown, or they can be fixed resistors. In either case the type of resistor and value of &:he resistance selected is based on the specific application. If the application is strain sensing, the resistor 14 or 17 is chosen to be a strain gage resistor. If the application is pressure sensing (or something that can be derived from pressure, such as contact sensing) a force sensitive resistor can be used. If position or proximity is to be sensed, the resistor 14 or 17 can be a fixed resistor, or some type of variable resistor can be used if other information is also desired.

The transmitter 2 (See FIG. 3) has a resonant frequency Fa that is determined by the values of capacitor 12 and transmitting inductor 13. The operation of the parallel passive transmitter 2 is a follows: The induction magnetic field produced by the coupled inductor 5 sets up a current in the transmitter 2 with a frequency equal to that in inductor 5. A sweeping of the frequency of the source 4 from F1 to F2 produces a spike 10a in the output 10 of the receiver 1. However, as the temperature in the environment of the passive transmitter 2 changes, the capacitance value of capacitor 12 varies, and therefore, the resonant frequency changes slightly from Fa and the output spike 10a is shifted to the left or right. See FIG. 3. This shift is therefore a measure of the change in temperature of the passive transmitter 2. If more than one sensor (passive transmitter 2 or 2a) is to be monitored by the same receiver 1, the resonant frequencies of the various sensors 2 or 2a can be designed to vary about different frequencies, Fa, Fb, etc. The sensors would then produce independent spikes 10a, 10b, etc. in the output 10. To correlate the time on the output signal 10, with the frequency being generated by the sweep signal source 4, the two signals can be synchronized, or the relationship between the signals may be apparent from the background noise in the output signal 10. Thus, the passive transmitter 2 or 2a can be used as a temperature sensor.

The functioning of the series passive transmitter 2a is the same as the parallel passive transmitter 2 for detecting temperature. However, for parameters such as strain or pressure that affect the resistance of the resistor 14 or 17, the series passive transmitter 2a and the parallel passive transmitter 2 act in opposite ways. For the parallel passive transmitter 2, a decrease in the resistance of the resistor 14 causes a decrease in the amplitude of the spike 10a or 10b of the output 10. For the series passive transmitter 2a, a decrease in the resistance of the resistor 17 causes an increase in the amplitude of the spike 10a or 10b of the output 10. Thus the amplitude of the output 10 of the receiver 1 can be used to determine the value of the parameter affecting the resistance of the resistor 14 or 17. Other processing equipment 11 may be used to transform the output 10 of the receiver 1 into a form directly readable as the value of the parameter of interest.

Position or proximity sensing is achieved by using a fixed resistor in the sensor 14 or 17, or by holding the resistance constant for a time. The amplitude of the signal is then dependent on the distance of separation between the inductor 13 or 15 and the inductor 5.

As an example of one application of the invention, consider a sensor 2 or 2a for monitoring the temperature, pressure, and position of a mold half 20a for a resin transfer molding mold 20. See FIG. 4. The sensor 2 or 2a is partially embedded in the moving part 20a of the mold. 20, and employs a force sensitive resistor as its resistor 14 or 17. The receiver 1 is fixed in location relative to the stationary part 20b of the mold 20. During the production of an article, the two halves 20a and 20b of the mold 20 are brought together, and resin is pumped into the cavity. The resin is heated and solidified, and the mold 20 is opened to remove the part. The mold 20 is then closed and the process is repeated. The temperature is important only when an article is being molded, but it can be monitored at all times. The pressure is also important during the molding process and is monitored by observing the amplitude of the spike 10a of the output signal 10 from the receiver 1. While the movable part 20a of the mold 20 is being opened, the pressure on the sensor 2 or 2a is constant at 0 psi, and the position of the movable part 20a of the mold 20 is indicated by the amplitude of the spike 10a of the output signal 10 of the receiver 1.

In any application, the processing equipment 11 is calibrated and programmed to separate any coupling between temperature and other parameters to be monitored.

Figure 5:
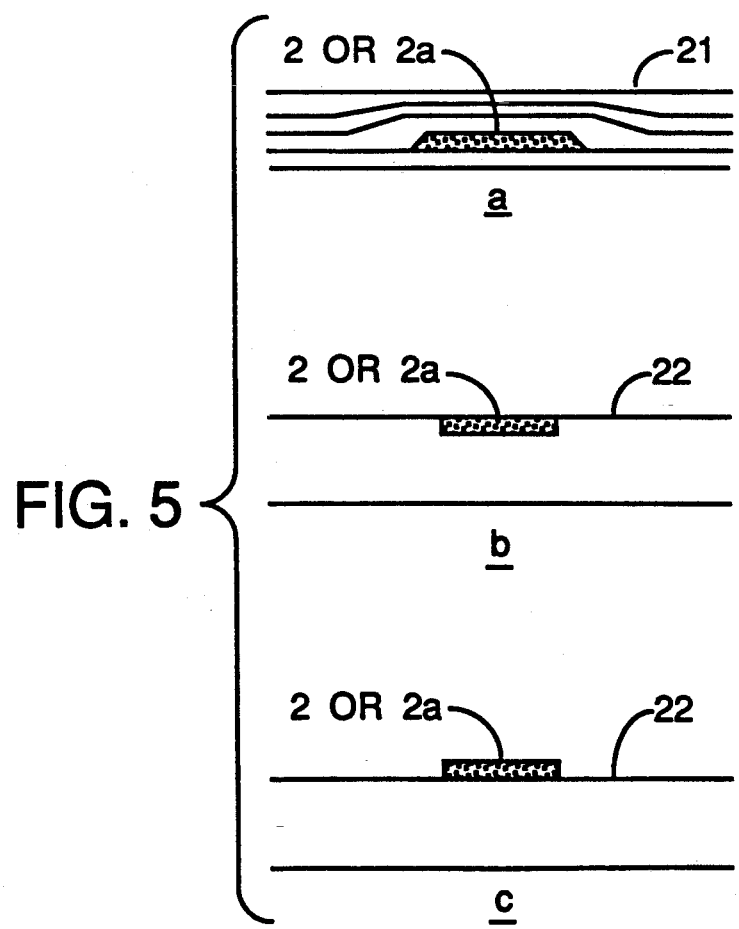
FIG. 5 illustrates methods for the sensor (passive transmitter) to be attached to a structure.

The sensor 2 or 2a can be embedded in a structure, if desired. See FIG. 5. One technique is to place the sensor 2 or 2a between plies of a composite material 21 during the manufacturing process. This will partially displace some of the composite material 21. The adhesion between the sensor 2 or 2a and the composite material 21 can be aided by surface preparation of the sensor 2 or 2a. An adhesive can also be used if desired.

A second embedment technique is to remove a portion of the host material 22 and bond or mechanically fasten the sensor 2 or 2a in place. The adhesion between the sensor 2 or 2a and the host material 22 can be aided by surface preparation of the sensor 2 or 2a and/or the host material 22.

The sensor 2 or 2a can also be bonded or mechanically fastened to the surface of a host material 22. The adhesion between the sensor 2 or 2a and the host material 22 can be aided by surface preparation of the sensor 2 or 2a and/or the host material 22.

The sensor 2 or 2a can also be repaired by removing the damaged sensor and replacing i&: with a new one. In the case of a sensor 2 or 2a embedded in a composite material 21, the new sensor 2 or 2a is embedded in or attached to the surface of the repair composite material 21. For other cases, the new sensor 2 or 2a can be emdedded in or attached to the repair material by any method desired.

ADVANTAGES AND NEW FEATURES OF THE INVENTION

The new feature of this invention, as compared with Warnagaris, is the use of a resistor in an unpowered passive transmitter. The simultaneous sensing of temperature and position or strain or pressure from the same sensor is also new.

Another feature of the invention is the practice of using the amplitude of the output as an indicator of the information being transmitted by the passive transmitter. The passive transmitter can also be embedded in a structure (composite or otherwise) or laid under layers of paint or other coatings, or attached to the surface of a structure. The sensor can be made thin enough so that it will have no adverse effects on the structure in which it is embedded or attached. It can also be chamfered at the edges so as to eliminate or reduce resin-rich areas in the composite structure, and to eliminate or reduce stress risers resulting from the geometry of the sensor. The sensor can be replaced if damaged while it is embedded in or mounted to a structure and is therefore completely repairable. This is a unique feature among embeddables. Furthermore, the repair of the sensor does not hinder or complicate the repair of the structure.

Many modification and adaptations of this invention will become apparent to persons skilled in the art. It is intended, therefore, that this invention be limited only by the appended claims, as read in the light of the prior art.

What is claimed is:

1. A passive sensor system comprising:
   a passive transmitter comprising a transmitting inductor and a capacitor defining a resonant frequency, and a resistor in circuit with said inductor and capacitor;
   a receiver comprising:
     a receiving inductor positioned in the near field of said transmitting inductor, said receiving inductor and said passive transmitting being initially in fixed space relationship,
     a reference inductor shielded from said transmitting inductor;
     a sweep signal source of energy, said receiving and reference inductors being supplied by said source, the frequency of said source being swept from a first frequency past said resonant frequency to a second frequency;
     a difference amplifier, the voltages developed across said receiving and reference inductors being applied to said difference amplifier to develop an output voltage, said output voltage having a peak when said sweep signal source is at said resonant frequency; said peak being temporally displaced when the resistance of said resistor is varied; and means for determining the change in amplitude of said peak and for determining the temporal shift of said peak at said resonant frequency, any change in amplitude being a measure of the effective change in the resistance of said resistor or in the change in proximity of said receiver from said transmitter, any change in temporal position of said peak being an indication of the change in the resonant frequency of said transmitter.

2. The sensor of claim 1 wherein said resistor is variable in response to an environmental condition.

3. The sensor of claim 1 wherein said resistor is variable in response to pressure.

4. The sensor of claim 1 wherein said resistor is variable in response to strain.

5. The sensor of claim 1, where the change of said output voltage is an indication of the relative movement of said transmitting inductor with respect to said receiving inductor.

* * * * *